(12) United States Patent
Nagasawa et al.

(10) Patent No.: US 10,550,217 B2
(45) Date of Patent: Feb. 4, 2020

(54) POLYMERIZABLE RESIN COMPOSITION COMPRISING REACTIVE SILSESQUIOXANE COMPOUND

(71) Applicant: NISSAN CHEMICAL INDUSTRIES, LTD., Tokyo (JP)

(72) Inventors: Takehiro Nagasawa, Funabashi (JP); Sayoko Tadokoro, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 352 days.

(21) Appl. No.: 15/565,615

(22) PCT Filed: Apr. 11, 2016

(86) PCT No.: PCT/JP2016/061710
§ 371 (c)(1),
(2) Date: Oct. 10, 2017

(87) PCT Pub. No.: WO2016/163561
PCT Pub. Date: Oct. 13, 2016

(65) Prior Publication Data
US 2018/0079849 A1    Mar. 22, 2018

(30) Foreign Application Priority Data

Apr. 10, 2015  (JP) ................. 2015-081235

(51) Int. Cl.
| | | |
|---|---|---|
| *C08G 77/20* | (2006.01) | |
| *C08F 290/14* | (2006.01) | |
| *C08F 299/08* | (2006.01) | |
| *G02B 1/04* | (2006.01) | |
| *C08F 2/44* | (2006.01) | |
| *C08G 77/04* | (2006.01) | |
| *C08G 77/00* | (2006.01) | |
| *B29D 11/00* | (2006.01) | |
| *B29K 83/00* | (2006.01) | |

(52) U.S. Cl.
CPC .... *C08F 290/148* (2013.01); *B29D 11/00442* (2013.01); *C08F 2/44* (2013.01); *C08F 290/14* (2013.01); *C08F 299/08* (2013.01); *C08G 77/045* (2013.01); *C08G 77/20* (2013.01); *C08G 77/80* (2013.01); *G02B 1/04* (2013.01); *G02B 1/041* (2013.01); *B29K 2083/00* (2013.01)

(58) Field of Classification Search
CPC .. C08G 77/20; C08F 290/148; C08F 290/142; G02B 1/041; B29D 11/00442; B29K 2083/00
See application file for complete search history.

(56) References Cited

U.S. PATENT DOCUMENTS

| | | | |
|---|---|---|---|
| 2010/0209669 A1 | 8/2010 | Aoai et al. | |
| 2011/0230584 A1* | 9/2011 | Araki | C08F 290/148 522/99 |

FOREIGN PATENT DOCUMENTS

| | | |
|---|---|---|
| EP | 3 127 929 A1 | 2/2017 |
| JP | H09-31136 A | 2/1997 |
| JP | 2008-297490 A | 12/2008 |
| JP | 2012-062398 A | 3/2012 |
| JP | 2013-49823 A | 3/2013 |
| JP | 2015-25075 A | 2/2015 |
| WO | 2013/047524 A1 | 4/2013 |
| WO | 2015/152154 A1 | 10/2015 |
| WO | 2015/159972 A1 | 10/2015 |

OTHER PUBLICATIONS

Jun. 27, 2019 Office Action issued in Chinese Patent Application No. 201680021031.2.
Jul. 5, 2016 Written Opinion issued in International Patent Application No. PCT/JP2016/061710.
Jul. 5, 2016 International Search Report issued in International Patent Application No. PCT/JP2016/061710.
Mar. 14, 2018 Supplementary European Search Report issued in European Patent Application No. 16776727.6.

* cited by examiner

*Primary Examiner* — Kuo Liang Peng
(74) *Attorney, Agent, or Firm* — Oliff PLC

(57) ABSTRACT

A polymerizable composition suitable for use in producing molded articles that can maintain a high refractive index, and can be prevented from cracking, peeling from a support, and dimensional changes due to a high-temperature thermal history. A polymerizable composition including (a) 100 parts by mass of a specific reactive silsesquioxane compound, (b) 10 to 500 parts by mass of a specific fluorene compound, and (c) 0.1 to 50 parts by mass of a polymer having a weight average molecular weight of 5,000 to 100,000; a cured product obtained by polymerizing the polymerizable composition; and a high-refractive-index resin lens material including the polymerizable composition.

10 Claims, No Drawings

POLYMERIZABLE RESIN COMPOSITION COMPRISING REACTIVE SILSESQUIOXANE COMPOUND

TECHNICAL FIELD

The present invention relates to a polymerizable resin composition comprising a reactive silsesquioxane compound. Specifically, the present invention relates to a polymerizable resin composition that can form a cured product having excellent optical characteristics (high refractive index and low Abbe's number) and high heat resistance (crack resistance, dimensional stability, and the like).

BACKGROUND ART

Plastic lenses are used for mobile phones, digital cameras, vehicle-mounted cameras, and the like, and are required to have excellent optical characteristics suitable for the purpose of the device. Plastic lenses are also required to have high durability including, for example, heat resistance and weather resistance, and high productivity that allows them to be molded at good yield, according to the form of use. Transparent resins such as polycarbonate resins, cycloolefin polymers, and methacrylic resins, for example, have been used as such resin materials.

For achieving a reduction in mounting costs, methods for mounting camera modules collectively by solder reflow have been recently proposed, and plastic lens materials used therefor that can withstand a high-temperature thermal history (for example, 260° C.) in the solder reflow step have been demanded. Conventional plastic lenses, however, have low heat resistance, and are difficult to adapt to the reflow process satisfactorily.

Moreover, a plurality of lenses are used for a high-resolution camera module, in which one of the lenses is required to be an optical material with high refractive index that serves as a wavelength correction lens. Furthermore, in order to improve the yield or production efficiency for manufacturing resin lenses, the molding process is shifting from injection molding that uses thermoplastic resins to press molding that uses curable resins liquid at room temperature.

As disclosed in Patent Document 1, however, most of the conventional materials proposed as materials featuring high refractive index only have improved heat resistance to temperatures not higher than 200° C., and have failed to ensure heat resistance to withstand the solder reflow step at 260° C., for example.

Meanwhile, since satisfactory reflow heat resistance cannot be readily achieved by using organic materials alone, materials provided with heat resistance by mixing organic materials with inorganic particles such as silica have been proposed (see Patent Document 2, for example). In these materials, however, the silica content needs to be increased to achieve satisfactory heat resistance, which has the drawback of precluding an increase in the refractive index of the composition. Moreover, these materials are poor in reliability, because they may have decreased transparency due to the aggregation of the inorganic particles, or may result in brittleness in cured products due to the addition of the particles.

PRIOR ART DOCUMENTS

Patent Documents

Patent Document 1: Japanese Patent Application Publication No. H09-31136 (JP H09-31136 A)

Patent Document 2: Japanese Patent Application Publication No. 2012-62398 (JP 2012-62398 A)

SUMMARY OF THE INVENTION

Problem to be Solved by the Invention

As described above, there has been no curable resin material that achieves satisfactory optical characteristics (high refractive index) to be usable as high-resolution camera module lenses, as well as satisfactory heat resistance in terms of crack resistance, peel resistance, dimensional stability, and the like against temperature variations, to be adaptable to a mounting process such as solder reflow. Hence, the development of such a curable resin material has been desired.

The present invention has been made in view of such circumstances, and an object of the present invention is to provide a polymerizable composition suitable for use in producing molded articles that can maintain a high refractive index, and can be prevented from cracking, peeling from a support, and dimensional changes due to a high-temperature thermal history.

Means for Solving the Problem

As a result of extensive research to solve the above-described problem, the present inventors found that molded articles that can maintain a high refractive index, and can be prevented from cracking, peeling from a support, and dimensional changes due to a high-temperature thermal history, can be produced by forming a composition comprising a specific reactive silsesquioxane compound, a specific fluorene compound, and a polymer having a weight average molecular weight of 5,000 to 100,000, thereby completing the present invention.

In summary, a first aspect of the present invention relates to: a polymerizable composition comprising:

(a) 100 parts by mass of a reactive silsesquioxane compound, which is a polycondensate of an alkoxy silicon compound A of formula [1] and an alkoxy silicon compound B of formula [2]:

$$Ar^1-Si(OR^1)_3 \qquad [1]$$

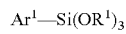

(wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group);

$$Ar^2-Si(OR^2)_3 \qquad [2]$$

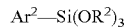

(wherein $Ar^2$ is a phenyl group optionally substituted with a $C_{1-6}$ alkyl group, a naphthyl group optionally substituted with a $C_{1-6}$ alkyl group, a biphenyl group optionally substituted with a $C_{1-6}$ alkyl group, or a phenanthryl group optionally substituted with a $C_{1-6}$ alkyl group; and $R^2$ is methyl group or ethyl group);

(b) 10 to 500 parts by mass of a fluorene compound of formula [3]:

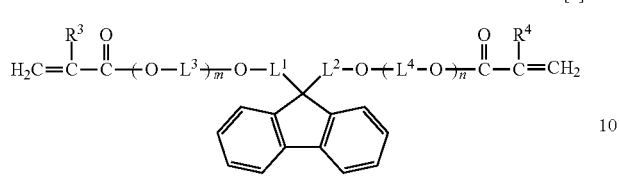

(wherein $R^3$ and $R^4$ are each independently a hydrogen atom or methyl group; $L^1$ and $L^2$ are each independently a phenylene group optionally having a substituent; $L^3$ and $L^4$ are each independently a $C_{1-6}$ alkylene group; and m and n are each zero or a positive integer such that m+n is 0 to 40); and (c) 0.1 to 50 parts by mass of a polymer having a weight average molecular weight of 5,000 to 100,000.

A second aspect of the present invention relates to the polymerizable composition according to the first aspect, wherein the polymer (c) is a polymer having at least a monomer unit of formula [4]:

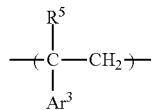

(wherein $Ar^a$ is a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group; and $R^5$ is a hydrogen atom or methyl group).

A third aspect of the present invention relates to the polymerizable composition according to the first or second aspect, which further comprises (d) 10 to 100 parts by mass of a (meth)acrylate compound different from the fluorene compound.

A fourth aspect of the present invention relates to the polymerizable composition according to the third aspect, wherein the (meth)acrylate compound (d) is a mono(meth)acrylate compound having an aromatic group.

A fifth aspect of the present invention relates to the polymerizable composition according to any one of the first to fourth aspects, wherein the reactive silsesquioxane compound (a) is a polycondensate of a compound of formula [1a] and at least one compound selected from the group consisting of compounds of formulas [2a], [2b], and [2c]:

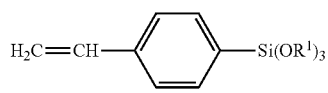

(wherein $R^1$ has the same meaning as defined above);

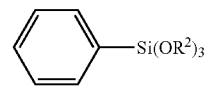

(wherein $R^2$ has the same meaning as defined above);

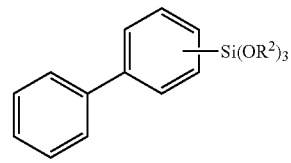

(wherein $R^2$ has the same meaning as defined above);

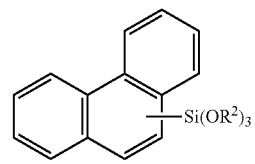

(wherein $R^2$ has the same meaning as defined above).

A sixth aspect of the present invention relates to the polymerizable composition according to any one of the first to fifth aspects, wherein a cured product obtained from the composition has an Abbe's number of 32 or less.

A seventh aspect of the present invention relates to a cured product obtained by polymerizing the polymerizable composition according to any one of the first to sixth aspects.

An eighth aspect of the present invention relates to a high-refractive-index resin lens material comprising the polymerizable composition according to any one of the first to sixth aspects.

A ninth aspect of the present invention relates to a method for producing a molded article comprising the steps of:

charging the polymerizable composition according to any one of the first to sixth aspects into a space between a support and a mold that are in contact with each other or an inside space of a dividable mold;

photopolymerizing the charged composition by exposure;

releasing the resulting photopolymerization product from the charged space; and heating the photopolymerization product before, during, or after the release.

A tenth aspect of the present invention relates to the method for producing a molded article according to the ninth aspect, wherein the molded article is a camera module lens.

Effects of the Invention

The cured product obtained from the polymerizable composition of the present invention has not only optical characteristics (high refractive index) desirable in a lens for an optical device such as a high-resolution camera module, but also heat resistance (crack resistance, peel resistance, dimensional stability, and the like) to be adaptable to a mounting process for a high-resolution camera module.

Thus, the high-refractive-index resin lens material of the present invention formed of the above-described polymerizable composition can be suitably used as a high-resolution module lens.

Moreover, the method for producing a molded article of the present invention can efficiently produce a molded article, particularly a camera module lens.

Furthermore, the polymerizable composition of the present invention has such a viscosity that it can be adequately handled without solvent; therefore, a molded article can be suitably molded therefrom by applying press processing against a mold such as a die (imprint technology).

MODES FOR CARRYING OUT THE INVENTION

<<Polymerizable Composition>>

The polymerizable composition of the present invention is a polymerizable composition comprising a specific reactive silsesquioxane compound as a component (a), a specific fluorene compound as a component (b), and a polymer having a weight average molecular weight of 5,000 to 100,000 as a component (c).

Each of the components will be hereinafter described in detail.

<(a) Reactive Silsesquioxane Compound>

The reactive silsesquioxane compound (a) used in the present invention is a compound obtained by polycondensation of an alkoxy silicon compound A having a specific structure and an alkoxy silicon compound B having a specific structure described below, in the presence of an acid or a base.

[Alkoxy Silicon Compound A]

The alkoxy silicon compound A is a compound of formula [1]:

[1]

wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group.

Examples of the phenyl group having at least one group with a polymerizable double bond of $Ar^1$ include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group.

Examples of the naphthyl group having at least one group with a polymerizable double bond of $Ar^1$ include 4-vinylnaphthalen-1-yl group, 5-vinylnaphthalen-1-yl group, 6-vinylnaphthalene-2-yl group, 4-allyloxynaphthalen-1-yl group, 5-allyloxynaphthalen-1-yl group, 8-allyloxynaphthalen-1-yl group, 5-vinyloxynaphthalen-1-yl group, 5-allylnaphthalen-1-yl group, and 5-isopropenylnaphthalen-1-yl group.

Examples of the biphenyl group having at least one group with a polymerizable double bond of $Ar^1$ include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Specific examples of the compound of formula [1] include, although not limited to, trimethoxy(4-vinylphenyl)silane, triethoxy(4-vinylphenyl)silane, (4-isopropenylphenyl)trimethoxysilane, trimethoxy(4-vinyl-1-naphthyl)silane, and trimethoxy(4'-vinyl-[1,1'-biphenyl]-4-yl)silane.

[Alkoxy Silicon Compound B]

The alkoxy silicon compound B is a compound of formula [2]:

[2]

wherein $Ar^2$ is a phenyl group optionally substituted with a $C_{1-6}$ alkyl group, a naphthyl group optionally substituted with a $C_{1-6}$ alkyl group, a biphenyl group optionally substituted with a $C_{1-6}$ alkyl group, or a phenanthryl group optionally substituted with a $C_{1-6}$ alkyl group; and $R^2$ is methyl group or ethyl group.

Examples of the phenyl group optionally substituted with a $C_{1-6}$ alkyl group of $Ar^2$ include phenyl group, o-tolyl group, m-tolyl group, p-tolyl group, 2,4,6-trimethylphenyl group, and 4-tert-butylphenyl group.

Examples of the naphthyl group optionally substituted with a $C_{1-6}$ alkyl group of $Ar^2$ include 1-naphthyl group, 2-naphthyl group, 4-methylnaphthalen-1-yl group, and 6-methylnaphthalen-2-yl group.

Examples of the biphenyl group optionally substituted with a $C_{1-6}$ alkyl group of $Ar^2$ include [1,1'-biphenyl]-2-yl group, [1,1'-biphenyl]-3-yl group, and [1,1'-biphenyl]-4-yl group.

Examples of the phenanthryl group optionally substituted with a $C_{1-6}$ alkyl group of $Ar^2$ include 1-phenanthryl group, 2-phenanthryl group, 3-phenanthryl group, 9-phenanthryl group, 6-methylphenanthren-1-yl group, 7-methylphenanthren-2-yl group, 6-methylphenanthren-3-yl group, 3-ethylphenanthren-9-yl group, and 2-ethylphenanthren-10-yl group.

Specific examples of the compound of formula [2] include, although not limited to, trimethoxy(phenyl)silane, triethoxy(phenyl)silane, trimethoxy(p-tolyl)silane, trimethoxy(naphthyl)silane, triethoxy(naphthyl)silane, ([1,1'-biphenyl]-4-yl)trimethoxysilane, ([1,1'-biphenyl]-4-yl)triethoxysilane, trimethoxy(2-phenanthryl)silane, trimethoxy(3-phenanthryl)silane, trimethoxy(9-phenanthryl)silane, and triethoxy(9-phenanthryl)silane.

The reactive silsesquioxane compound as the component (a) is preferably a reactive silsesquioxane compound obtained by polycondensation of a compound of formula [1a] and at least one compound selected from the group consisting of compounds of formulas [2a], [2b], and [2c], in the presence of an acid or a base:

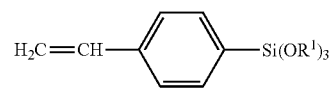

[1a]

wherein $R^1$ has the same meaning as defined above;

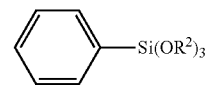

[2a]

wherein R² has the same meaning as defined above;

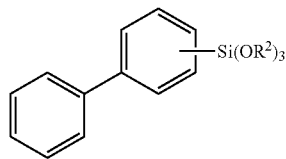

[2b]

wherein R² has the same meaning as defined above;

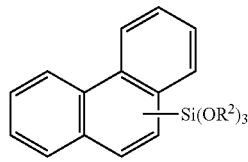

[2c]

wherein R² has the same meaning as defined above.

[Proportions of Alkoxy Silicon Compound A and Alkoxy Silicon Compound B Used]

The molar ratio used for the polycondensation reaction of the alkoxy silicon compound A of formula [1] and the alkoxy silicon compound B of formula [2] used for the reactive silsesquioxane compound as the component (a) is not particularly limited; typically, the molar ratio is preferably in the range where the alkoxy silicon compound A:the alkoxy silicon compound B=5:1 to 1:5, in order to stabilize the physical properties of the cured product. More preferably, the molar ratio is in the range between 3:1 to 1:3. When the ratio of the number of moles of the alkoxy silicon compound A to the number of moles of the alkoxy silicon compound B is 5 or less, unreacted polymerizable double bond can be inhibited from remaining in the cured product, resulting in a more firm cured product. When the ratio of the number of moles of the alkoxy silicon compound A to the number of moles of the alkoxy silicon compound B is 1/5 or more, a sufficient crosslink density can be achieved, which allows the dimensional stability against heat to be further improved.

Suitable compounds may be selected as required, for use as the alkoxy silicon compounds A and B, or a plurality of compounds may be used in combination for each of the alkoxy silicon compounds A and B. In this case also, the ratio of the total molar amount of the alkoxy silicon compound A to the total molar amount of the alkoxy silicon compound B falls within the above-defined range.

[Acid or Basic Catalyst]

The polycondensation reaction between the alkoxy silicon compound A of formula [1] and the alkoxy silicon compound B of formula [2] is suitably performed in the presence of an acid or basic catalyst.

The catalyst used for the polycondensation reaction is not particularly limited in type as long as it dissolves or is homogeneously dispersed in the below-described solvent. A suitable catalyst may be selected as required, and used.

Examples of usable catalysts include acidic compounds including inorganic acids such as hydrochloric acid, nitric acid, and sulfuric acid, and organic acids such as acetic acid and oxalic acid; basic compounds such as alkali metal hydroxides, alkaline earth metal hydroxides, ammonium hydroxide, quaternary ammonium salts, and amines; and fluoride salts such as NH₄F and NR₄F, wherein R is at least one selected from the group consisting of a hydrogen atom, a $C_{1-12}$ linear alkyl group, a $C_{3-12}$ branched alkyl group, and a $C_{3-12}$ cyclic alkyl group.

These catalysts may be used alone or in combination of two or more.

Examples of the acidic compounds include hydrochloric acid, nitric sulfuric acid, acetic acid, oxalic acid, and boric acid.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride salts include ammonium fluoride, tetramethylammonium fluoride, and tetrabutylammonium fluoride.

Among these catalysts, one or more selected from the group consisting of hydrochloric acid, acetic acid, potassium hydroxide, calcium hydroxide, barium hydroxide, and tetraethylammonium hydroxide are preferably used.

The amount of the catalyst used is 0.01 to 10% by mass, and preferably 0.1 to 5% by mass, based on the total mass of the alkoxy silicon compounds A and B. When the amount of the catalyst used is 0.01% by mass or more, the reaction proceeds more satisfactorily. In consideration of economy, the catalyst may be used in an amount of 10% by mass or less.

[Polycondensation Reaction]

One feature of the reactive silsesquioxane compound according to the present invention is the structure of the alkoxy silicon compound A. The reactive group (polymerizable double bond) contained in the alkoxy silicon compound A used in the present invention is readily polymerized by radicals or cations, and exhibits high heat resistance after polymerization (after curing).

The hydrolytic polycondensation reaction between the alkoxy silicon compounds A and B can be performed without solvent; however, a solvent inert to both the alkoxy silicon compounds such as tetrahydrofuran (THF) as described below can be used as a reaction solvent. The use of such a reaction solvent readily makes the reaction system homogeneous, and thus, has an advantage in that the polycondensation reaction is more stably performed.

As described above, although the synthesis reaction of the reactive silsesquioxane compound can be performed without solvent, a solvent may be used without any problem to make the reaction more homogeneous. The solvent is not particularly limited as long as it is unreactive with both alkoxy silicon compounds, and dissolves the polycondensate.

Examples of such reaction solvents include ketones such as acetone and methyl ethyl ketone (MEK); aromatic hydrocarbons such as benzene, toluene, and xylene; ethers such as tetrahydrofuran (THF), 1,4-dioxane, diisopropylether, and cyclopentyl methyl ether (CPME); glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethyl formamide (DMF). These solvents may be used alone or as a mixture of two or more.

The reactive silsesquioxane compound used in the present invention is obtained by hydrolytic polycondensation of the alkoxy silicon compound A of formula [1] and the alkoxy silicon compound B of formula [2], in the presence of an acid or basic catalyst. The reaction temperature used in the hydrolytic polycondensation is 20 to 150° C., and preferably 30 to 120° C.

The reaction time is not particularly limited as long as it is not shorter than a time required to terminate an increase in the molecular weight of the polycondensate, and stabilize the molecular weight distribution. More specifically, the reaction time is from several hours to several days.

After the completion of the polycondensation reaction, it is preferred that the obtained reactive silsesquioxane compound be collected using any method such as filtration or solvent distillation, and then be subjected to a suitable purification process, as required.

The polycondensation compound obtained by this reaction has a weight average molecular weight Mw of 500 to 100,000, preferably 500 to 30,000, as measured by GPC relative to polystyrene, and has a degree of distribution, i.e., Mw (weight average molecular weight)/Mn (number average molecular weight), of 1.0 to 10.

<(b) Fluorene Compound>

The fluorene compound (b) used in the present invention is a compound of formula [3]:

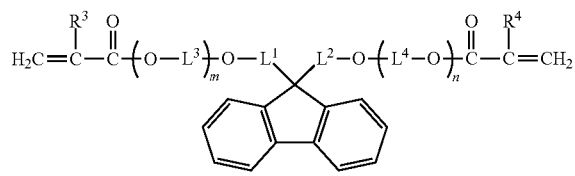

[3]

wherein $R^3$ and $R^4$ are each independently a hydrogen atom or methyl group; $L^1$ and $L^2$ are each independently a phenylene group optionally having a substituent; $L^3$ and $L^4$ are each independently a $C_{1-6}$ alkylene group; and m and n are each zero or a positive integer such that m+n is 0 to 40.

Examples of the phenylene group optionally having a substituent of $L^1$ and $L^2$ include o-phenylene group, m-phenylene group, p-phenylene group, 2-methylbenzene-1,4-diyl group, 2-aminobenzene-1,4-diyl group, 2,4-dibromobenzene-1,3-diyl group, and 2,6-dibromobenzene-1,4-diyl group.

Examples of the $C_{1-6}$ alkylene group of $L^3$ and $L^4$ include methylene group, ethylene group, trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the compound of formula [3], m and n preferably satisfy the condition where m+n is 0 to 30, and more preferably satisfy the condition where m+n is 2 to 20.

Specific examples of the compound of formula [3] include, although not limited to, 9,9-bis(4-(2-(meth)acryloyloxyethoxy)phenyl)-9H-fluorene, OGSOL (registered trademark) EA-0200, EA-F5003, EA-F5503, and EA-F5510 [all from Osaka Gas Chemicals Co., Ltd.], and NK ester A-BPEF [from Shin Nakamura Chemical Co., Ltd.].

In the polymerizable composition of the present invention, the amount of the component (b) is 10 to 500 parts by mass, and preferably 30 to 250 parts by mass, based on 100 parts by mass of the component (a).

<(c) Polymer>

The polymer (c) used in the present invention is a polymer whose weight average molecular weight Mw as measured by gel permeation chromatography (GPC) relative to polystyrene is 5,000 to 100,000, preferably 10,000 to 80,000, and still more preferably 20,000 to 60,000.

Moreover, the polymer (c) is preferably a polymer having at least a monomer unit of formula [4] or a monomer unit of formula [5], and more preferably a polymer having at least a monomer unit of formula [4] and a monomer unit of formula [5].

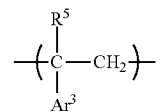

[4]

wherein $Ar^3$ is a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group; and $R^5$ is a hydrogen atom or methyl group.

Examples of the phenyl group optionally substituted with a $C_{1-6}$ alkyl group, the naphthyl group optionally substituted with a $C_{1-6}$ alkyl group, and the biphenyl group optionally substituted with a $C_{1-6}$ alkyl group of $Ar^3$ are the same as those described above for $Ar^2$ in formula [2].

Specific examples of the monomer unit of formula [4] include 1-phenylethylene group, 1-methyl-1-phenylethylene group, 1-(naphthalen-1-yl)ethylene group, 1-([1,1'-biphenyl]-2-yl)ethylene group, 1-([1,1'-biphenyl]-3-yl)ethylene group, and 1-([1,1'-biphenyl]-4-yl)ethylene group, with 1-phenylethylene group being preferred.

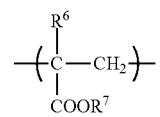

[5]

wherein $R^6$ is a hydrogen atom or methyl group, and $R^7$ is a $C_{1-12}$ alkyl group.

Examples of the $C_{1-12}$ alkyl group of $R^7$ include methyl group, ethyl group, n-propyl group, isopropyl group, n-butyl group, isobutyl group, sec-butyl group, tert-butyl group, n-pentyl group, isoamyl group, neopentyl group, tert-amyl group, sec-isoamyl group, cyclopentyl group, n-hexyl group, cyclohexyl group, n-heptyl group, n-octyl group, 2-ethylhexyl group, n-nonyl group, n-decyl group, n-dodecyl group, benzyl group, and phenethyl group.

Specific examples of the monomer unit of formula [5] include 1-methoxycarbonylethylene group and 1-methoxycarbonyl-1-methylethylene group.

Specific examples of such polymers include styrene-based polymers such as polystyrene, acrylonitrile-chlorinated polyethylene-styrene copolymer (ACS), acrylonitrile-butadiene-styrene copolymer (ABS), acrylonitrile-EPDM (ethylene-propylene-diene terpolymer)-styrene copolymer (APS), acrylonitrile-styrene copolymer (AS), acrylonitrile-styrene-acrylate copolymer (ASA), methyl methacrylate-butadiene-styrene copolymer (MBS), methyl methacrylate-styrene copolymer (MS), silicone-acrylonitrile-styrene copolymer (SAS), styrene-butadiene copolymer (SBC), and styrene-maleic anhydride copolymer (SMA); (meth)acrylic polymers such as poly(methyl acrylate) and poly(methyl methacrylate) (PMMA); polyolefins such as polyethylene (PE) and polypropylene (PP); polyimide (PA); polycarbonate (PC); polyesters such as poly(ethylene terephthalate) (PET) and polybutylene terephthalate) (PBT); cyclic polyolefin (COP); polyarylether; polyetheretherketone (PEEK); polyethersulfone (PES); polyurethane (PU); and fluorene-polyester resins (for example, OKP4 from Osaka Gas Chemicals Co., Ltd.).

Preferred among the above are styrene-based polymers, and more preferred are polystyrene and methyl methacrylate-styrene copolymer.

When a copolymer is used as the polymer (c), the molar ratio of the monomer units forming the copolymer is not particularly limited. For example, in the case of a copolymer having the monomer unit of formula [4] and the monomer unit of formula [5], the molar ratio of these monomer units is preferably the monomer unit of formula [4]:the monomer unit of formula [5]=99:1 to 10:90.

In the polymerizable composition of the present invention, a single polymer or a mixture of two or more may be used as the polymer (c). The amount of the polymer (c) used is preferably 0.1 to 50 parts by mass, more preferably 0.5 to 30 parts by mass, and particularly preferably 1 to 20 parts by mass, based on 100 parts by mass of the reactive silsesquioxane compound (a).

<(d) (Meth)acrylate Compound Different from Fluorene Compound>

The polymerizable composition of the present invention may further comprise, as the component (d), a (meth)acrylate compound different from the fluorene compound (b). In particular, the (meth)acrylate compound (d) is preferably a mono(meth)acrylate compound having an aromatic group.

The "(meth)acrylate compound" in the present invention as used herein refers to both an acrylate compound and a methacrylate compound. For example, "(meth)acrylic acid" refers to acrylic acid and methacrylic acid.

Examples of the mono(meth)acrylate compound having an aromatic group include, although no limited to, benzyl (meth)acrylate, 2-phenoxyethyl (meth)acrylate, phenoxydiethylene glycol (meth)acrylate, phenoxypolyethylene glycol (meth)acrylate, 2-hydroxy-3-phenoxypropyl (meth)acrylate, neopentyl glycol benzoate (meth)acrylate, and ethoxylated o-phenylphenol (meth)acrylate.

Examples of (meth)acrylate compounds as the component (d) other than the mono(meth)acrylate compound having an aromatic group include, although not limited to, methyl (meth)acrylate, ethyl (meth)acrylate, 2,2,2-difluoroethyl (meth)acrylate, n-propyl (meth)acrylate, isopropyl (meth)acrylate, n-butyl (meth)acrylate, sec-butyl (meth)acrylate, isobutyl (meth)acrylate, tert-butyl (meth)acrylate, n-hexyl (meth)acrylate, n-octyl (meth)acrylate, isobornyl (meth)acrylate, adamantyl (meth)acrylate, dicyclopentanyl (meth)acrylate, dicyclopentenyl (meth)acrylate, 2-(dicyclopentanyloxy)ethyl (meth)acrylate, 2-(dicyclopentenyloxy)ethyl (meth)acrylate, tetrahydrofurfuryl (meth)acrylate, ethylene glycol di(meth)acrylate, diethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,3-butanediol di(meth)acrylate, 1,4-butanediol di(meth)acrylate, neopentyl glycol di(meth)acrylate, propoxylated neopentyl glycol di(meth)acrylate, neopentyl glycol mono(hydroxypivalate) (meth)acrylate, 3-methyl-1,5-pentanediol di(meth)acrylate, 1,6-hexanediol di(meth)acrylate, 2-(3-hydroxy-2-methylpropyl-2-yl)-5-ethyl-5-hydroxymethyl-1,3-dioxane di(meth)acrylate (also called dioxane glycol di(meth)acrylate), tricyclo[$5.2.1.0^{2,6}$] decane dimethanol di(meth)acrylate, trimethylolethane tri(meth)acrylate, trimethylolpropane tri(meth)acrylate, ethoxylated trimethylolpropane tri(meth)acrylate, propoxylated trimethylolpropane tri(meth)acrylate, pentaerythritol tetra(meth)acrylate, ethoxylated pentaerythritol tetra(meth)acrylate, ditrimethylolpropane tetra(meth)acrylate, and dipentaerythritol hexa(meth)acrylate.

When a (meth)acrylate compound as the component (d) is used, a single compound or a mixture of two or more may be used as the (meth)acrylate compound. In the polymerizable composition of the present invention, the amount of the component (d) is 10 to 100 parts by mass based on 100 parts by mass of the component (a).

<(e) Polymerization Initiator>

The polymerizable composition of the present invention may comprise a polymerization initiator (e) in addition to the components (a) to (c) or components (a) to (d). Any of a photopolymerization initiator and a thermal polymerization initiator can be used as the polymerization initiator.

Examples of the photopolymerization initiator include alkylphenones, benzophenones, acylphosphine oxides, Michler's benzoylbenzoates, oxime esters, tetramethylthiuram monosulfides, and thioxanthones.

In particular, a photocleavable photoradical polymerization initiator is preferred. Examples of the photocleavable photoradical polymerization initiator include those described in "Saishin UV Koka Gijutsu" ("Latest UV Curing Technology") (p. 159, publisher: Kazuhiro Takausu, published by TECHNICAL INFORMATION INSTITUTE CO., LTD, 1991).

Examples of commercially available photoradical polymerization initiators include IRGACURE (registered trademark) 184, 369, 651, 500, 819, 907, 784, 2959, CGI1700, CGI1750, CGI1850, CG24-61 and TPO, and Darocur (registered trademark) 1116 and 1173 [all from BASF Japan Ltd.], and ESACURE KIP150, KIP65LT, KIP100F, KT37, KT55, KTO46 and KIP75 [all from Lamberti].

Examples of the thermal polymerization initiator include azos and organic peroxides.

Examples of commercially available azo-based thermal polymerization initiators include V-30, V-40, V-59, V-60, V-65 and V-70 [all from Wako Pure Chemical Industries, Ltd.].

Examples of commercially available organic peroxide-based thermal polymerization initiators include, although not limited to, Perkadox (registered trademark) CH, BC-FF, 14 and 16, Trigonox (registered trademark) 22, 23 and 121, Kayaester (registered trademark) P and O, and Kayabutyl (registered trademark) B [all from Kayaku Akzo Corporation], and PERHEXA (registered trademark) HC, PERCUMYL (registered trademark) H, PEROCTA (registered trademark) O, PERHEXYL (registered trademark) O and Z, and PERBUTYL (registered trademark) O and Z (all from NOF Corporation).

When a polymerization initiator is added, a single polymerization initiator or a mixture of two or more may be used as the polymerization initiator. The amount of the polymerization initiator added is 0.1 to 20 parts by mass, and preferably 0.3 to 10 parts by mass, based on the total amount, i.e., 100 parts by mass, of the components (a) to (c) or the components (a) to (d) which are polymerizable components.

Furthermore, a preferred aspect of the present invention is a polymerizable composition wherein a cured product obtained therefrom has an Abbe's number of 32 or less, from the viewpoint of providing a high refractive index for the cured product obtained from the polymerizable composition.

<Other Additives>

The polymerizable composition of the present invention may also contain, as required, a chain transfer agent, an antioxidant, an ultraviolet absorber, a photostabilizer, a leveling agent, a rheology-controlling agent, an adhesion adjuvant such as a silane coupling agent, a pigment, a dye, a defoaming agent, and the like, without impairing the effects of the present invention.

Examples of the chain transfer agent include:

thiol compounds including mercaptocarboxylic acid esters such as methyl mercaptoacetate, methyl 3-mercaptopropionate, 2-ethylhexyl 3-mercaptopropionate, 3-methoxybutyl 3-mercaptopropionate, n-octyl 3-mercaptopropionate stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols such as ethanethiol, 2-methylpropane-2-thiol, n-dodecanethiol, 2,3,3,4,4,5-hexamethylhexane-2-thiol (tert-dodecanethiol); ethane-1,2-dithiol, propane-1,3-dithiol, and benzylthiol; aromatic thiols such as benzenethiol, 3-methylbenzenethiol, 4-methylbenzenethiol, naphthalene-2-thiol, pyridine-2-thiol, benzimidazole-2-thiol, and benzothiazole-2-thiol; mercaptoalcohols such as 2-mercaptoethanol and 4-mercapto-1-butanol; and silane-containing thiols such as 3-(trimethoxysilyl)propane-1-thiol and 3-(triethoxysilyl)propane-1-thiol;

disulfide compounds including alkyl disulfides such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl) disulfide(di-tert-dodecyl disulfide), bis(2,2-diethoxyethyl) disulfide, bis(2-hydroxyethyl) disulfide, and dibenzyl disulfide; aromatic disulfides such as diphenyl disulfide, di-p-tolyl disulfide, di(pyridin-2-yl)pyridyl disulfide, di(benzimidazol-2-yl) disulfide, and di(benzothiazol-2-yl) disulfide; thiuram disulfides such as tetramethylthiuram disulfide, tetraethylthiuram disulfide, tetrabutylthiuram disulfide, and bis(pentamethylene)thiuram disulfide; and α-methylstyrene dimer.

When a chain transfer agent is added, a single chain transfer agent or a mixture of two or more may be used as the chain transfer agent. The amount of the chain transfer agent added is 0.01 to 20 parts by mass, and preferably 0.1 to 10 parts by mass, based on the total amount, i.e., 100 parts by mass, of the components (a) to (c) or the components (a) to (d) which are polymerizable components.

Examples of the antioxidant include phenolic antioxidants, phosphoric acid-based antioxidants, and sulfide-based antioxidants, with phenolic antioxidants being preferred.

Examples of phenolic antioxidants include IRGANOX (registered trademark) 245, 1010, 1035, 1076 and 1135 [all from BASF Japan Ltd.], SUMILIZER (registered trademark) GA-80, GP, MDP-S, BBM-S and WX-R [all from Sumitomo Chemical Co., Ltd.], and ADK STAB (registered trademark) AO-20, AO-30, AO-40, AO-50, AO-60, AO-80 and AO-330 [all from ADEKA Corporation].

When an antioxidant is added, a single antioxidant or a mixture of two or more may be used as the antioxidant. The amount of the antioxidant added is 0.01 to 20 parts by mass, and preferably 0.1 to 10 parts by mass, based on the total amount, i.e., 100 parts by mass, of the components (a) to (c) or the components (a) to (d) which are polymerizable components.

<Method for Preparing Polymerizable Composition>

The method for preparing the polymerizable composition of an embodiment of the present invention is not particularly limited. Examples of the preparation method include a method in which the components (a) to (c) and optionally the components (d) and (e) are mixed in predetermined proportions, and other additives are further added, as desired, and mixed to form a homogeneous solution; and a method in which a conventional solvent is used in addition to these components.

When a solvent is used, the solids content in the polymerizable composition of the present invention is not particularly limited as long as the components are homogeneously dissolved in the solvent; for example, the solids content is 1 to 50% by mass, 1 to 30% by mass, or 1 to 25% by mass. The "solids content" as used herein refers to the content of matter from which the solvent component has been removed from all components of the polymerizable composition.

The solution of the polymerizable composition is preferably used a being filtered through a filter with a pore size of 0.1 to 5 μm.

<<Cured Product>>

According to the present invention, a cured product can be obtained by exposing the polymerizable composition to light (photocuring) or heating the polymerizable composition (thermal curing).

Examples of exposure light beams include ultraviolet light, electron beam, and X-ray. Examples of light sources that can be used for UV irradiation include sunlight, a chemical lamp, a low-pressure mercury lamp, a high-pressure mercury lamp, a metal halide lamp, a xenon lamp, and UV-LED. After the exposure, post-exposure bake may be applied to stabilize the physical properties of the cured product. The method of post-exposure bake is not particularly limited; typically, post-exposure bake is performed with a hot plate or an oven, for example, at 50 to 260° C. for 1 to 120 minutes.

The heating conditions for thermal curing are typically selected, as appropriate, from 50 to 300° C. and 1 to 120 minutes, although not particularly limited thereto. Examples of heating means include, although not particularly limited thereto, a hot plate and an oven.

The cured product obtained by curing the polymerizable composition of the present invention has a high refractive index, i.e., 1.55 or more, at a wavelength of 589 nm, and is prevented from cracking or peeling from a support due to heating, and thus, has dimensional stability. The cured product, therefore, can be suitably used as a high-refractive-index resin lens material.

<<Molded Article>>

Various molded articles can be readily produced in parallel with the formation of the cured product, by applying conventional molding processes such as, for example, compression molding (imprinting or the like), casting, injection molding, and blow molding to the polymerizable composition of the present invention. Molded articles thus obtained are also contemplated by the present invention.

Preferred as a method for producing such a molded article is, for example, a method for producing a molded article comprising the steps of:

charging the above-described polymerizable composition of the present invention into a space between a support and a mold that are in contact with each other or an inside space of a dividable mold;

photopolymerizing the charged composition by exposure;

releasing the resulting photopolymerization product from the charged space; and heating the photopolymerization product before, during, or after the release.

In the step of charging the polymerizable composition, a mold may be placed on a support such as a glass substrate, and then the polymerizable composition of the present invention may be charged into a space between the support and the mold; alternatively, the polymerizable composition may be charged into an inside space of a mold that is dividable into two or three mold sections, for example.

The step of photopolymerization by exposure can be performed by applying the conditions described in <<Cured Product>> above.

In the heating step, the photopolymerization product may be heated before or after the releasing step, or during releasing, i.e., the photopolymerization product may be heated simultaneously with the releasing operation. Alternatively, the photopolymerization product may be heated from before releasing to after releasing. For example, the photopolymerization product may be released from the charged space between the support and the mold, and then heated on the support; alternatively, the photopolymerization product charged into the inside space of the dividable mold may be heated without being released therefrom.

The conditions for the heating step are typically selected, as appropriate, from 50 to 260° C. and 1 to 120 minutes, although not particularly limited thereto. Examples of heating means include, although not particularly limited thereto, a hot plate and an oven.

The molded article produced by this method can be suitably used as a camera module lens.

EXAMPLES

The present invention will be hereinafter described in more detail with reference to examples; however, the present invention is not limited to the following examples.

In the Examples, the apparatuses and conditions used for the preparation of samples and analysis of physical properties are as follows:

(1) Stirring and Defoaming Machine
Apparatus: planetary centrifugal mixer, AWATORI-RENTARO (THINKY MIXER) (registered trademark) ARE-310 from THINKY CORPORATION
(2) UV Exposure
Apparatus: batch-process UV irradiator (high-pressure mercury lamp, 2 kW×one lamp) from EYE GRAPHICS CO., LTD.
(3) Nanoimprinter
Apparatus: NM-0801HB from Meisyo Kiko Co., Ltd.
Pressing pressure: 150 N
UV exposure dose: 20 mW/cm$^2$, 150 seconds (4) Reflow Oven
Apparatus: table-top reflow oven STR-3100 from SHINAPEX CO., LTD.
(5) Gel Permeation Chromatography (GPC)
Apparatus: Prominence (registered trademark) GPC system from Shimadzu Corporation
Column: Shodex (registered trademark) GPC KF-804L and GPC KF-803L from Showa Denko K.K.
Column temperature: 40° C.
Solvent: tetrahydrofuran
Detector: RI
Calibration curve: standard polystyrene
(6) Volatile Content
Apparatus: halogen moisture analyzer HR83 from Mettler Toledo
(7) Refractive Index $n_D$ and Abbe's Number $v_D$
Apparatus: multiwavelength Abbe refractometer DR-M4 from ATAGO CO., LTD.
Measurement temperature: 20° C.
(8) Lens Height Measurement and Crack Observation
Apparatus: contactless surface texture measuring instrument PF-60 from Mitaka Kohki Co., Ltd.

The abbreviations represent the following meanings:
PTMS: trimethoxy(phenyl)silane [from Shin-Etsu Chemical Co., Ltd.]
STMS: trimethoxy(4-vinylphenyl)silane [from Shin-Etsu Chemical Co., Ltd.]
FDA: bisarylfluorene diacrylate [OGSOL (registered trademark) EA-F5503 from Osaka Gas Chemicals Co., Ltd.]
BnA: benzyl acrylate [Viscoat #160 from Osaka Organic Chemical Industry Ltd.]
NPGDA: neopentyl glycol diacrylate [KAYARAD (registered trademark) NPGDA from Nippon Kayaku Co., Ltd.]
PS: polystyrene [MS0103, Mw: 32,000 from Negami Chemical Industrial Co., Ltd.]
DDT: n-dodecanethiol [THIOKALCOL 20 from Kao Corporation]
DDDS: didecyl disulfide [from Tokyo Chemical Industry Co., Ltd.]
I1010: pentaerythritol tetrakis[3-(3,5-di-tert-butyl-4-hydroxyphenyl)propionate] [IRGANOX (registered trademark) 1010 from BASF Japan Ltd.]
I184: 1-hydroxycyclohexyl phenyl ketone [IRGACURE (registered trademark) 184 from BASF Japan Ltd.]
TPO: diphenyl(2,4,6-trimethylbenzoyl)phosphine oxide [IRGACURE (registered trademark) TPO from BASF Japan Ltd.]

Production Example 1

Production of Reactive Silsesquioxane Compound 1 (SQ55B)

A 300-mL reaction flask equipped with a condenser was charged with 2.97 g (7.1 mmol) of 35% by mass tetraethylammonium hydroxide, 89.5 g of tetrahydrofuran, and 9.5 g of ion-exchanged water, and the air in the flask was purged with nitrogen using a nitrogen balloon. To this mixture, a mixture of 39.6 g (177 mmol) of STMS and 35.0 g (177 mmol) of PTMS was added dropwise at room temperature (about 23° C.) for 10 minutes. The reaction mixture was heated to 40° C. and stirred for 4 hours.

The reaction mixture was cooled to room temperature (about 23° C.), 70.6 g of a 1.2% by mass acetic acid/ethyl acetate solution (14 mmol calculated as acetic acid) was added thereto, and the reaction was stopped after the aqueous phase became neutral to acidic. This reaction mixture was then added to 448 g of ethyl acetate and 223 g of ion-exchanged water, and the organic phase was isolated using a separation funnel. The resulting organic phase was washed with ion-exchanged water three times, and concentrated using a rotary evaporator to obtain 96.8 g of a solution of a reactive silsesquioxane compound 1 (hereinafter also abbreviated to SQ55B).

Measurement of the volatile content at 100° C. revealed that the SQ55B content in the resulting solution was 53.9% by mass. The resulting compound had a weight average molecular weight Mw of 4,000 as measured by GPC relative to polystyrene and a degree of distribution Mw/Mn of 1.8.

Example 1

The SQ55B solution produced in Production Example 1 as a reactive silsesquioxane compound (40.7 parts by mass calculated as SQ55B) and 16.6 parts by mass of BnA as another (meth)acrylate compound were mixed, and then the solvent was distilled off using a rotary evaporator. To the residue, 39.7 parts by mass of FDA as a fluorene compound, 1.5 parts by mass of NPGDA as another (meth)acrylate compound, 1.5 parts by mass of PS as a polymer, 0.5 part by mass of DDDS as a chain transfer agent (reaction accelerator), 0.5 part by mass of I1010 as an antioxidant, and 2 parts by mass of I184 and 0.5 part by mass of TPO as a polymerization initiator, were added, the components were mixed with stirring at 50° C. for 3 hours, and then the mixture was defoamed with stirring for 10 minutes to prepare a polymerizable composition 1.

Examples 2 to 4 and Comparative Example 1

Polymerizable compositions 2 to 5 were prepared as in Example 1, except that each of the compositions was changed as shown in Table 1. In Table 1, "part(s)" denotes "part(s) by mass".

exposed to UV light at 20 mW/cm$^2$ for 150 seconds, and then heated in an oven at 150° C. for 20 minutes. The polymerizable composition was cooled to room temperature (about 23° C.), and then the cured product was removed from the glass substrates to produce a specimen with a diameter of 30 mm and a thickness of 800 μm.

The resulting specimen was measured for refractive index $n_D$ at a D ray (wavelength: 589 nm) and Abbe's number $v_D$. The results are shown in Table 2.

Examples 5 to 8 and Comparative Example 2

Each of the polymerizable compositions 1 to 5 was molded on a glass substrate serving as a support, using a nanoimprinter with a nickel mold (twenty-five 2-mm-diameter lens-shaped molds arranged in five rows and five columns). The mold had been previously subjected to a release treatment with Novec (registered trademark) 1720 [from 3M Corporation]. The glass substrate had been previously subjected to an adhesion treatment with SILQUEST (registered trademark) A-174 SILANE [from Momentive Performance Materials Japan LLC]. After the mold was removed, the resulting product was heated in an oven at 150° C. for 20 minutes to produce convex lenses on the glass substrate.

For random six convex lenses on the resulting glass substrate, the lens height (thickness) was measured before and after a heating test with a reflow oven, using a contactless surface texture measuring instrument, and the dimensional stability after heating was evaluated based on the change ratio (=(lens height before heating−lens height after heating)÷lens height before heating×100). Furthermore, the lenses after the heating test were inspected for cracks and peeled portions with a microscope supplied with the contactless surface texture measuring instrument. The heating test was performed as follows: for each polymerizable

TABLE 1

| Example/ Comparative Example | Polymerizable Composition | SQ55B [Part(s)] | FDA [Part(s)] | (Meth)Acrylate | [Part(s)] | Polymer | [Part(s)] | Chain Transfer Agent | [Part(s)] | I1010 [Part(s)] | I184 [Part(s)] | TPO [Part(s)] |
|---|---|---|---|---|---|---|---|---|---|---|---|---|
| Example 1 | Polymerizable Composition 1 | 40.7 | 39.7 | BnA NPGDA | 16.6 1.5 | PS | 1.5 | DDDS | 0.5 | 0.5 | 2 | 0.5 |
| Example 2 | Polymerizable Composition 2 | 40.7 | 32.7 | BnA NPGDA | 16.6 5.0 | PS | 5.0 | DDDS | 0.5 | 0.5 | 2 | 0.5 |
| Example 3 | Polymerizable Composition 3 | 40.7 | 39.7 | BnA | 18.1 | PS | 1.5 | DDT | 0.5 | 0.5 | 2 | 0.5 |
| Example 4 | Polymerizable Composition 4 | 40.7 | 39.7 | BnA | 18.1 | PS | 1.5 | none | — | — | 2 | 0.5 |
| Comparative Example 1 | Polymerizable Composition 5 | 40.7 | 42.7 | BnA | 16.6 | none | — | DDDS | 0.5 | 0.5 | 2 | 0.5 |

[Evaluation of Optical Characteristics]

Each polymerizable composition, together with an 800-μm-thick silicone rubber spacer, was sandwiched between two glass substrates that had been subjected to a release treatment. The sandwiched polymerizable composition was composition, the resulting convex lenses with the glass substrate were placed in a reflow oven, and three steps, i.e., 1) heating to 260° C. in 3 minutes, 2) maintaining at 260° C. for 20 seconds, and 3) allowing to cool to 50° C., were repeated three times. The results are shown in Table 2.

TABLE 2

| Example/ Comparative Example | Polymerizable Composition | Refractive Index $n_D$ | Abbe's Number $v_D$ | Number of Cracks/Peeled Portions | Lens Height [μm] | | Change Ratio [%] |
|---|---|---|---|---|---|---|---|
| | | | | | before Heating | after Heating | |
| Example 5 | Polymerizable Composition 1 | 1.596 | 30 | 0/6 | 478.5 | 475.9 | 0.54 |
| Example 6 | Polymerizable Composition 2 | 1.592 | 30 | 0/6 | 468.5 | 466.5 | 0.43 |

TABLE 2-continued

| Example/ Comparative Example | Polymerizable Composition | Refractive Index $n_D$ | Abbe's Number $v_D$ | Number of Cracks/Peeled Portions | Lens Height [µm] before Heating | Lens Height [µm] after Heating | Change Ratio [%] |
|---|---|---|---|---|---|---|---|
| Example 7 | Polymerizable Composition 3 | 1.595 | 29 | 0/6 | 479.5 | 476.8 | 0.56 |
| Example 8 | Polymerizable Composition 4 | 1.598 | 28 | 0/6 | 465.5 | 463.6 | 0.41 |
| Comparative Example 2 | Polymerizable Composition 5 | 1.597 | 29 | 4/6 | 470.2 | 468.0 | 0.48 |

As shown in Table 2, the cured products (convex lenses) obtained from the polymerizable compositions of the present invention (Examples 5 to 8) formed no cracks in the lenses and the surrounding flat cured products, and were not peeled at all from the glass substrates, even after being subjected to the reflow step at 260° C. three times. Furthermore, these cured products exhibited a sufficiently small change in lens height, and thus, high dimensional stability. Consequently, all the cured products obtained from the polymerizable compositions of the present invention were confirmed to have high dimensional stability as well as excellent crack resistance and peel resistance after heating (for example, the solder reflow step at 260° C.).

On the other hand, the cured product obtained without the addition of the specific polymer (Comparative Example 2) was confirmed to have low crack resistance and peel resistance, thus failing to withstand the solder reflow step.

INDUSTRIAL APPLICABILITY

The polymerizable composition of the present invention provides a cured product having a high refractive index. The cured product obtained from the polymerizable composition of the present invention also has excellent heat resistance that prevents cracking, peeling from the support, and dimensional changes even in a high-temperature process, for example, a high-temperature thermal history in the reflow step at 260° C., for example. The cured product of the present invention, therefore, can be suitably used as a camera module lens material, for example. The cured product certainly also has transparency and hardness (strength) naturally required in such a camera module lens material, for example.

The invention claimed is:

1. A polymerizable composition comprising:
(a) 100 parts by mass of a reactive silsesquioxane compound, which is a polycondensate of an alkoxy silicon compound A of formula [1] and an alkoxy silicon compound B of formula [2]:

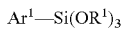  [1]

wherein —$Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group;

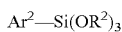  [2]

wherein—$Ar^2$ is a phenyl group optionally substituted with a $C_{1-6}$ alkyl group, a naphthyl group optionally substituted with a $C_{1-6}$ alkyl group, a biphenyl group optionally substituted with a $C_{1-6}$ alkyl group, or a phenanthryl group optionally substituted with a $C_{1-6}$ alkyl group; and $R^2$ is methyl group or ethyl group;

(b) 10 to 500 parts by mass of a fluorene compound of formula [3]:

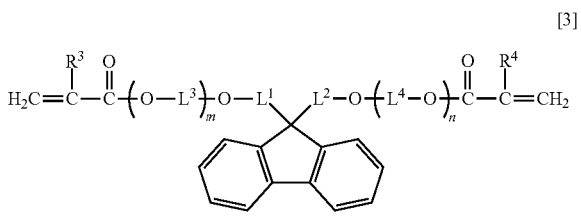  [3]

wherein $R^3$ and $R^4$ are each independently a hydrogen atom or methyl group; $L^1$ and $L^2$ are each independently a phenylene group optionally having a substituent; $L^3$ and $L^4$ are each independently a $C_{1-6}$ alkylene group; and m and n are each zero or a positive integer such that m+n is 0 to 40; and (c) 0.1 to 50 parts by mass of a polymer having a weight average molecular weight of 5,000 to 100,000.

2. The polymerizable composition according to claim 1, wherein the polymer (c) is a polymer having at least a monomer unit of formula [4]:

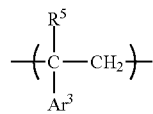  [4]

wherein $Ar^a$ is a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group; and $R^5$ is a hydrogen atom or methyl group.

3. The polymerizable composition according to claim 1, which further comprises (d) 10 to 100 parts by mass of a (meth)acrylate compound different from the fluorene compound.

4. The polymerizable composition according to claim 3, wherein the (meth)acrylate compound (d) is a mono(meth)acrylate compound having an aromatic group.

5. The polymerizable composition according to claim 1, wherein the reactive silsesquioxane compound (a) is a polycondensate of a compound of formula [1a] and at least one compound selected from the group consisting of compounds of formulas [2a], [2b], and [2c]:

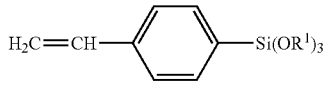
[1a]

wherein —R¹ has the same meaning as defined above;

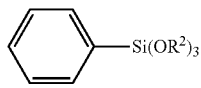
[2a]

wherein —R² has the same meaning as defined above;

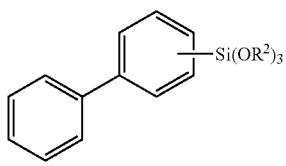
[2b]

wherein —R² has the same meaning as defined above;

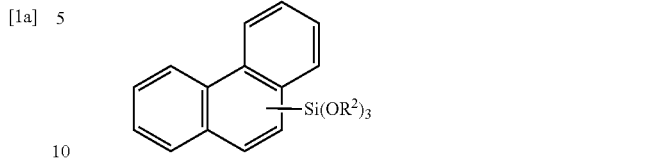
[2c]

wherein R² has the same meaning as defined above.

6. The polymerizable composition according to claim 1, wherein a cured product obtained from the composition has an Abbe's number of 32 or less.

7. A cured product obtained by polymerizing the polymerizable composition according to claim 1.

8. A high-refractive-index resin lens material comprising the polymerizable composition according to claim 1.

9. A method for producing a molded article comprising the steps of:
   charging the polymerizable composition according to claim 1 into a space between a support and a mold that are in contact with each other or an inside space of a dividable mold;
   photopolymerizing the charged composition by exposure;
   releasing the resulting photopolymerization product from the charged space; and
   heating the photopolymerization product before, during, or after the release.

10. The method for producing a molded article according to claim 9, wherein the molded article is a camera module lens.

* * * * *